(12) United States Patent
Yumoto

(10) Patent No.: US 8,751,373 B2
(45) Date of Patent: Jun. 10, 2014

(54) ACCOUNT MANAGEMENT SYSTEM

(75) Inventor: Kazutaka Yumoto, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 4812 days.

(21) Appl. No.: 10/012,548

(22) Filed: Dec. 12, 2001

(65) Prior Publication Data

US 2002/0123948 A1 Sep. 5, 2002

(30) Foreign Application Priority Data

Mar. 1, 2001 (JP) ................................. 2001-056118

(51) Int. Cl.
*G06Q 40/00* (2012.01)

(52) U.S. Cl.
USPC .......................................................... 705/38

(58) Field of Classification Search
CPC ........ G06Q 40/00; G06Q 10/00; G06Q 30/00
USPC .............................................. 705/35, 39, 42
See application file for complete search history.

(56) References Cited

U.S. PATENT DOCUMENTS

2001/0011249 A1* 8/2001 Yanagihara et al. ............ 705/41
2002/0007343 A1* 1/2002 Oyama et al. .................... 705/39

FOREIGN PATENT DOCUMENTS

| JP | 7-160792 A | 6/1995 |
| JP | 9-259203 A | 10/1997 |
| JP | 2000-132611 A | 5/2000 |

OTHER PUBLICATIONS

Office of the Comptroller of the Currency staff; Money Laundering: A Banker's Guide to Avoiding Problems, Dec. 2002, Office of the Comptroller of the Currency, online, 1-35.*

* cited by examiner

*Primary Examiner* — Marissa Liu
(74) *Attorney, Agent, or Firm* — Rabin & Berdo P.C.

(57) ABSTRACT

This invention provides novel and improved account management system, account management method and account management program, capable of summing up the deposit/withdraw according to the item of expenditure in real-time and automatically with regard to any accounts of user's. More specifically, when a client of a banking agency is registered as the user of a system 10, a system account corresponding respectively to the user's banking account opened at the banking agency is opened in the system 10. The user requests for the openings of one or more virtual accounts related to each of the system account by accessing the system 10 from a user terminal A22*a* or a user terminal B22*b* through the Internet 21. Preferably, the virtual account is opened according to an item of expenditure.

24 Claims, 9 Drawing Sheets

| 2000-09-25 TO 2000-10-24 | | | | | |
|---|---|---|---|---|---|
| ACCOUNT / VIRTUAL ACCOUNT | | BALANCE BROUGHT FORWARD FROM LAST MONTH | DEPOSIT | WITHDRAW | BALANCE |
| | PUBLIC UTILITY CHARGES (VIRTUAL ACCOUNT A$_1$) | -5,230yen | 30,000yen | 23,025yen | 1,745yen |
| | HOUSING EXPENSES (VIRTUAL ACCOUNT A$_2$) | 10,000yen | 100,000yen | 85,000yen | 25,000yen |
| | FOOD EXPENSES (VIRTUAL ACCOUNT A$_3$) | -20,000yen | 70,000yen | 53,000yen | -3,000yen |
| | ACCOUNT A MASTER | 323,025yen | 50,000yen | 50,000yen | 323,025yen |
| ACCOUNT A | | 307,795yen | 250,000yen | 211,025yen | 346,770yen |
| | TRAVELING EXPENSES (VIRTUAL ACCOUNT B$_1$) | 50,000yen | 30,000yen | 75,000yen | 5,000yen |
| | ACCOUNT B MASTER | 30,155yen | 50,000yen | 30,000yen | 50,155yen |
| ACCOUNT B | | 80,155yen | 80,000yen | 105,000yen | 55,155yen |
| TOTAL | | 387,950yen | 330,000yen | 316,025yen | 401,925yen |

FIG.2

| USER | ACCOUNT NAME | ACCOUNT CLASSIFICATION | ACCOUNT NUMBER | RESTRICTION ON OVERDRAWING TO MAKE BALANCE INSUFFICIENT |
|---|---|---|---|---|
| USER A | 1234567 | REAL ACCOUNT | 1 2 3 4 5 6 7 | |
| USER A | AAA | VIRTUAL ACCOUNT | 1 2 3 4 5 6 7 | RESTRICTED |
| USER A | BBB | VIRTUAL ACCOUNT | 1 2 3 4 5 6 7 | NOT RESTRICTED |
| USER A | 3333333 | REAL ACCOUNT | 3 3 3 3 3 3 3 | |

FIG.4

| USER | ACCOUNT NAME | PROCESSING DATE / TIME | DEPOSIT INFORMATION | WITHDRAW INFORMATION | BALANCE | ABSTRACT | NOTES |
|---|---|---|---|---|---|---|---|
| USER A | 1234567 | 2000-09-25 12:35 | 500,000yen | | 750,000yen | DIRECT DEPOSIT | |
| USER A | AAA | 2000-09-28 13:35 | | 20,000yen | 720,000yen | ELECTRICITY EXPENSES | |
| USER A | 2222222 | 2000-09-30 14:35 | | 70,000yen | 140,000yen | MONTHLY ALLOWANCE | |
| USER A | 3333333 | 2000-09-26 12:30 | 350,000yen | | 440,000yen | PAID BY CREDITING FROM B | |

| ACCOUNT / VIRTUAL ACCOUNT | | BALANCE BROUGHT FORWARD FROM LAST MONTH | DEPOSIT | WITHDRAW | BALANCE |
|---|---|---|---|---|---|
| | PUBLIC UTILITY CHARGES (VIRTUAL ACCOUNT A1) | -5,230yen | 30,000yen | 23,025yen | 1,745yen |
| | HOUSING EXPENSES (VIRTUAL ACCOUNT A2) | 10,000yen | 100,000yen | 85,000yen | 25,000yen |
| | FOOD EXPENSES (VIRTUAL ACCOUNT A3) | -20,000yen | 70,000yen | 53,000yen | -3,000yen |
| | ACCOUNT A MASTER | 323,025yen | 50,000yen | 50,000yen | 323,025yen |
| ACCOUNT A | | 307,795yen | 250,000yen | 211,025yen | 346,770yen |
| | TRAVELING EXPENSES (VIRTUAL ACCOUNT B1) | 50,000yen | 30,000yen | 75,000yen | 5,000yen |
| | ACCOUNT B MASTER | 30,155yen | 50,000yen | 30,000yen | 50,155yen |
| ACCOUNT B | | 80,155yen | 80,000yen | 105,000yen | 55,155yen |
| TOTAL | | 387,950yen | 330,000yen | 316,025yen | 401,925yen |

FIG.6

| USER | CONDITION | DISTRIBUTED ACCOUNT |
|---|---|---|
| USER A | DIRECT DEPOSIT | VIRTUAL ACCOUNT A |
| USER A | DIRECT DEBIT (ELECTRICITY) | VIRTUAL ACCOUNT B |
| USER A | CREDIT CARD | VIRTUAL ACCOUNT C |
| USER A | PAID BY CREDITING FROM B | VIRTUAL ACCOUNT D |
| USER A | PAY BY CREDITING INTO C'S ACCOUNT | VIRTUAL ACCOUNT E |

FIG.7

| USER | ACCOUNT NUMBER | DETAILS NUMBER | PROCESSING DATE / TIME | ACCOUNT NAME | DEPOSIT INFORMATION | WITHDRAW INFORMATION | BALANCE | ABSTRACT | NOTES |
|---|---|---|---|---|---|---|---|---|---|
| USER A | 1234567 | 21334 | 2000-09-25 12:35 | A A A | 500,000yen | | 750,000yen | DIRECT DEPOSIT | |
| USER A | 1234567 | 21335 | 2000-09-28 13:35 | B B B | | 20,000yen | 720,000yen | ELECTRICITY EXPENSES | |
| USER A | 2222222 | 21336 | 2000-09-30 14:35 | E E E | | 70,000yen | 140,000yen | MONTHLY ALLOWANCE | |
| USER A | 3333333 | 13245 | 2000-09-26 12:30 | D D D | 350,000yen | | 440,000yen | PAID BY CREDITING FROM B | |

FIG.8

| USER | CONDITION | DISTRIBUTION MEANS | PRIORITY | DISTRIBUTION STANDARD | DISTRIBUTED ACCOUNT | NOTES |
|---|---|---|---|---|---|---|
| USER A | DIRECT DEPOSIT | PERCENTAGE | 1 | 70% | VIRTUAL ACCOUNT AA | |
| USER A | DIRECT DEPOSIT | PERCENTAGE | 2 | 30% | VIRTUAL ACCOUNT AB | |
| USER B | DIRECT DEPOSIT | SUM OF MONEY | 1 | 30,000 | VIRTUAL ACCOUNT BA | SCHOOLING FUND |
| USER B | DIRECT DEPOSIT | SUM OF MONEY | 2 | 200,000 | VIRTUAL ACCOUNT BB | LIVING EXPENSES |
| USER B | DIRECT DEPOSIT | SUM OF MONEY | 3 | 30,000 | VIRTUAL ACCOUNT BC | TRAVELING FUND |
| USER C | PHONE BILL | SUM OF MONEY | 1 | 50,000 | VIRTUAL ACCOUNT CA | |
| USER C | PHONE BILL | SUM OF MONEY | 2 | 100,000 | VIRTUAL ACCOUNT CB | |

FIG.9

| USER | TARGET ACCOUNT | CONDITION | DISTRIBUTED ACCOUNT |
|---|---|---|---|
| USER A | 1234567 | DIRECT DEPOSIT | VIRTUAL ACCOUNT A |
| USER A | 1234567 | DIRECT DEBIT (ELECTRICITY) | VIRTUAL ACCOUNT B |
| USER A | 1234567 | CREDIT CARD | VIRTUAL ACCOUNT C |
| USER A | 2222222 | DIRECT DEBIT (GAS) | VIRTUAL ACCOUNT B |
| USER A | 2222222 | PAY BY CREDITING INTO B'S ACCOUNT | VIRTUAL ACCOUNT C |

ACCOUNT MANAGEMENT SYSTEM

BACKGROUND OF THE INVENTION

1. Field of the Invention

The present invention relates to an account management system, an account management method and an account management program.

2. Related Art

With the recent widespread use of the Internet, so-called "Internet banking system" providing clients with various services such as balance inquiry, issuance of deposit/withdraw details, transfer, credit and the like through the Internet has been progressively introduced. According to the Internet banking system, a client of a banking or financial agency can use various services by operating a terminal equipment connected to the Internet such as a personal computer, PDA (Personal Digital Assistant), a cell phone and the like. The user using the services need not go to the home or branch office of the banking agency to achieve an extremely high degree of convenience.

In many cases, a three-layer structure is adopted in the Internet banking system comprising a web server, an application server and a database server in order to achieve a high degree of scalability. These servers are directly or indirectly connected to a host computer installed in a banking agency.

When the client of the banking agency uses the Internet banking system, a client's account is opened at the system. The account opened at the system (hereafter, referred to as "a system account") corresponds to a client's account opened at the banking agency (hereafter, referred to as "a banking account") respectively, and each account interlocks in real-time especially with regard to an account process.

By the way, the client of each banking agency can use a tele-banking system as well as the Internet banking system. According to the tele-banking system, since the client of each banking agency receives various services by operating a telephone the user need not go to the home or branch office of the banking agency similarly to receiving the Internet service. However, when the user selects the tele-banking system, the number of services the user can use is to be limited due to the restriction on the function of the telephone. For example, form issuance is one of the services with which it is hard for the tele-banking system to provide.

On the other hand, the user of the Internet banking system receives various services by using the Internet terminal equipment such as a personal computer and accessing the web server constructing the system. Various kinds of input/output forms can be easily realized by combining the Internet terminal equipment and the web server. Therefore, each user can use the same services as the ones provided by the automatic teller machine (ATM) terminal at each banking agency or the ones provided at a bank counter.

The Internet terminal equipment is usually provided with a cathode-ray tube (CRT) and a liquid crystal display and is connected to a printing means such as a printer. Hereby the user of the Internet banking system can also use a form issuance service such as the issuance of deposit/withdraw details.

However, a conventional Internet system has the following problems.

(1) When a user wants to grasp the deposit/withdraw state according to the item of expenditure with regard to his account, the user need obtain the withdraw/deposit details in a form of electronic data, convert the data and sum up the details according to the item of expenditure, for example, direct deposit, direct debit of public utility charges and the like.

(2) In paying by transfer or by crediting, the user cannot specify the item of expenditure as the additional information. Consequently, when the expenses of the transfer or crediting need to be summed up according to the item of expenditure, the user has to judge the item of expenditure by the date or time when the transfer or crediting has been made and which is described in the obtained electronic details or by the person to whom the transfer or crediting has been made.

(3) Although the contents of the banking account are reflected on the system account in real-time, it is impossible for the user to obtain the sum according to the item of expenditure.

(4) The banking account corresponds to the system account respectively. For this reason, if the user has a plurality of banking accounts, there should be a plurality of system accounts, corresponding to the number of the banking account. According to the conventional Internet banking system, since each system account exists independently it is a troublesome operation for the user to manage the deposit/withdraw together according to the item of expenditure with regard to the plural system accounts.

As described above, the conventional Internet banking system has not provided the user with a high degree of convenience necessarily as for managing the deposit/withdraw according to the item of expenditure.

The present invention has been achieved in views of aforementioned problems. The object of the present invention is to provide novel and improved account management system, account management method and account management program, capable of summing up the deposit/withdraw according to the item of expenditure in real-time and automatically with regard to any accounts of user's including the deposit/withdraw through ATM or a bank counter.

SUMMARY OF THE INVENTION

In the first aspect of the present invention to achieve the above object, there is provided an account management system for managing one or more banking accounts opened at a banking agency comprising a virtual account opening means for opening one or more virtual accounts related to each of the banking accounts according to the instruction from a terminal equipment through a network; and an inter-account process executing means for executing an account process between each of the virtual accounts and each of the banking accounts and an account process between each of the virtual accounts.

In the second aspect of the present invention, there are provided an account management program installed in a computer connected to a network and a storage medium for storing this program. The account management program makes the computer function as a virtual account opening means and an inter-account process executing means. The virtual account opening means opens one or more virtual accounts related one or more banking accounts according to the instruction from a terminal equipment connected to the network. The inter-account process executing means executes an account process between each of the virtual accounts and each of the banking accounts and an account process between each of the virtual accounts.

In the third aspect of the present invention, there is provided an account management method for managing one or more banking accounts opened at a banking agency comprising: a virtual account opening step for opening one or more virtual accounts related to each of the banking accounts according to the instruction from a terminal equipment through a network; and an inter-account process executing step for executing an account process between each of the virtual accounts and each of the banking accounts and an account process between each of the virtual accounts.

Preferably, each virtual account is opened according to each account process in each banking account or the item of expenditure. The deposit/withdraw state with regard to a specific account process and item of expenditure can be grasped easily and in real-time by summing up each detail of deposit/withdraw in each virtual account.

In the present invention, a plurality of virtual accounts can be allocated to one account process selected among various account processes corresponding to each of the banking accounts, and the amount of money deposited and withdrawn in the account process can be distributed to the plurality of the virtual accounts allocated to the account process automatically according to a specific condition. If each virtual account is opened according to each item of expenditure, the planning of deposit/withdraw according to each item of expenditure can be utilized.

Also in the present invention, a restriction on the sum of money deposited into and withdrawn from each of the virtual accounts can be put. For example, an account process in which the balance of virtual account would be insufficient is prohibited. In this case, the user can refrain from overspending with regard to a specific item of expenditure.

Further in the present invention, a virtual account related a plurality of banking accounts is opened. The user can grasp the deposit/withdraw state with regard to the item of expenditure related to a plurality of banking agencies in common easily and in real-time. If each of the banking accounts belongs to different users respectively, the deposit/withdraw state with regard to the item of expenditure related to each of the users in common can be grasped easily and in real-time.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIG. 2 shows an example of an account information management table stored in a virtual account management information DB belonging to the Internet banking system in the first embodiment of the present invention.

FIG. 4 shows an example of a deposit/withdraw details table stored in a deposit/withdraw details information DB belonging to the Internet banking system in the first embodiment of the present invention.

FIG. 5 shows an example of expenditure item total table to be replied to a user by the Internet banking system in the first embodiment of the present invention.

FIG. 6 shows an example of an account information management table stored in a virtual account management information DB belonging to the Internet banking system in the second embodiment of the present invention.

FIG. 7 shows an example of a deposit/withdraw details table stored in a deposit/withdraw details information DB belonging to the Internet banking system in the second embodiment of the present invention.

FIG. 8 shows an example of a virtual account distribution table stored in a virtual account management information DB belonging to the Internet banking system in the third embodiment of the present invention.

FIG. 9 shows an example of an account information management table stored in a virtual account management information DB belonging to the Internet banking system in the fifth embodiment of the present invention.

DETAILED DESCRIPTION OF THE PREFERRED EMBODIMENTS

Figure 1:
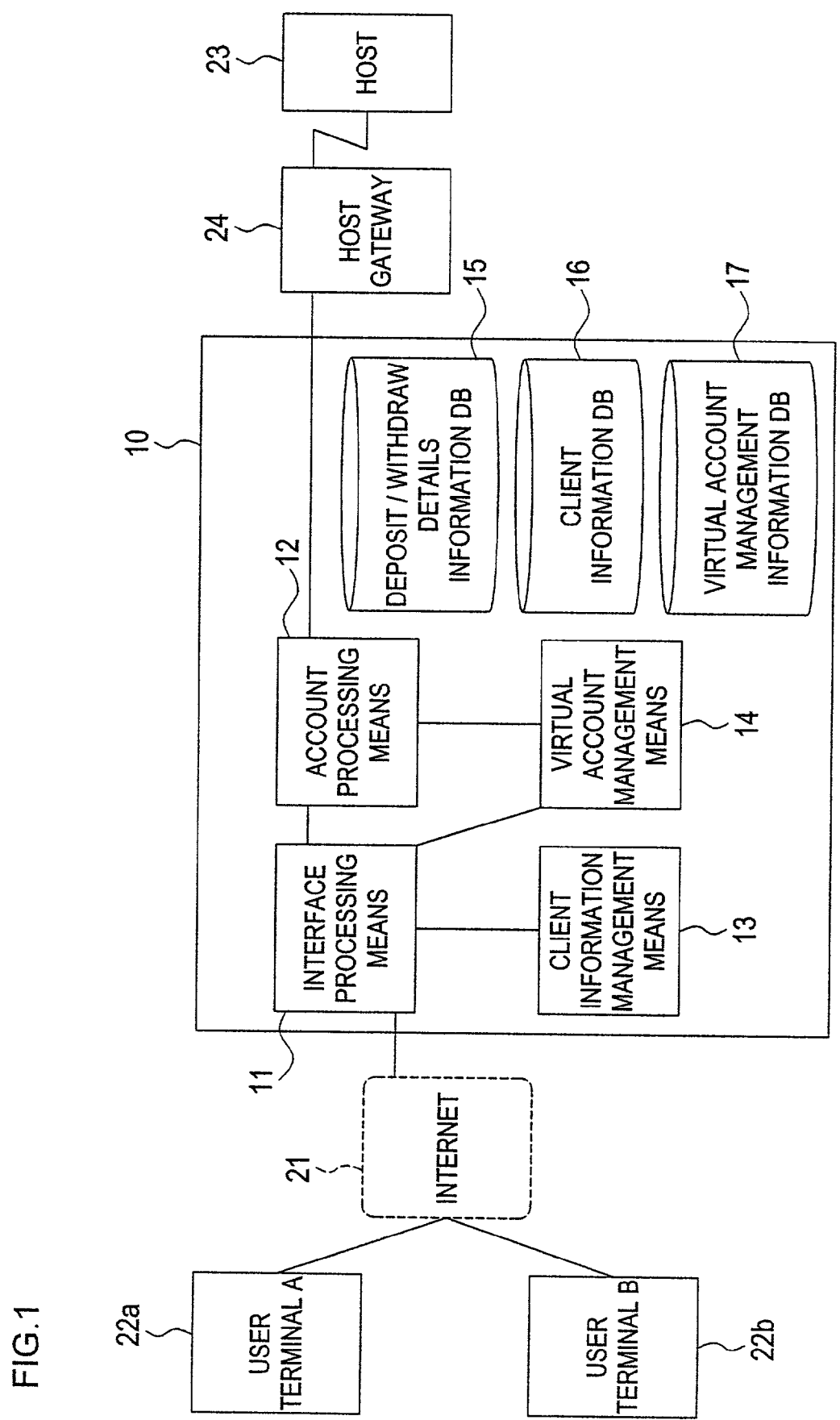
FIG. 1 shows a structure of the Internet banking system in the first embodiment of the present invention.

Hereinafter, the preferred embodiment of the present invention will be described in reference to the accompanying drawings. Same reference numerals are attached to components having same functions in following description and the accompanying drawings, and a description thereof is omitted.

(First Embodiment)

The Internet banking system (hereafter, referred to as "system") 10 in this embodiment of the present invention comprises mainly an operating means such as CPU and MPU, a semiconductor memory, a storing means such as a magnetic disc, and one or more server machines configured by a communication interface and the like, as shown in FIG. 1. A user uses various services by operating a user terminal A22*a* or a user terminal B22*b* and accessing the system 10 through Internet 21.

In structuring the system 10, it is cost-saving to adopt a concentrated server architecture in a single server machine. On the other hand, a distributed server model that can be realized by adopting a plurality of server machines organically connected to each other may be adopted from the viewpoint of improving the flexibility and reliability of the system. Also, the system 10 and other systems can be structured in parallel.

The user who opens his account (banking account) at a banking agency such as a bank, an insurance company and a brokerage, and uses various banking-related services such as deposit, withdraw, transfer, credit, setting time deposit, debit, checking balance and issuance of deposit/withdraw details by using the account can be accepted as the user of system 10. Also, any form of user such as private user, corporation, profit-making company and public-policy group can be the user of system 10.

Similarly, anyone, for example, private user, corporation, profit-making company, public-policy group and the like can engage in conducting and managing the system 10. In addition, the system conductor and manager can also conduct and manage the banking agency at the same time.

When the user wants to use the system 10, it is necessary to open his account at the banking agency (hereafter, referred to as "banking account") in advance as described above. And then the user is registered as the user of system 10 by the banking agency or the conductor and manager of system 10.

In the system 10, the registered user's account (hereafter, referred to as "system account") is opened. Each of the user's system account corresponds to each of the user's banking account respectively and interactively.

When the banking-related process is requested with regard to each banking account opened at the banking agency, the process is executed by a host 23 and the result is reflected on each system account opened at the system 10 in real-time. On the other hand, when the banking-related process is requested with regard to each system account opened at the system 10, the requested process is also executed by a host 23 with regard to the banking account corresponding to the system account, and the result is reflected on corresponding system account.

The user terminal A22a and the user terminal B22b are equipments accessible to the Internet 21, for example, a personal computer, a cell phone, a electronic organizer, PDA (Personal Digital Assistant), a digital TV, a game machine, a videophone or the like. And preferably, user terminal A22a and the user terminal B22b comprise an operating means such as CPU and MPU, a semiconductor memory, a storing means such as a magnetic disc, an input means such as a keyboard and a mouse, a display means such as CRT and a liquid crystal display, a communication interface and the like. And further preferably, a printing means such as a printer is connected to the terminals.

Actually, many users use various services by operating many user terminals and accessing the system 10. In this embodiment, however, these terminals are represented by the user terminals A22a and B22b as a matter of convenience of explanation.

The host 23 connected to the system 10 through a host gateway 24 is a host computer distributed to a banking agency. This host computer functions as executing various banking-related processes on each account opened at the banking agency and as an electronic passbook or roll to record the result the process.

For example, when a user requests a banking agency for various banking-related services, the host 23 executes various banking-related processes by using the user's account opened at the banking agency and records the result of process (amount of money, the person or company who has deposited into the user's account, the person or company into the account of whom the money will be transferred and the like), relating to the user's account.

The host 23 is also connected to the ATM terminal at a banking agency, the processing terminal at a bank counter and the like as well as the system 10 (not shown). The banking-related process requested through the ATM terminal or the banking counter is transmitted to the host 23, by which the requested process is executed and the result of process is recorded. The banking-related process requested through so-called a tele-banking system in which a telephone is used is also transmitted to the host 23, by which the requested process is executed and the result of process is recorded.

The host gateway 24 is hardware or software adjusting the protocols of the network to which the host 23 belongs and the network to which the system 10 belongs in order to connect the network to which the host 23 belongs and the network to which the system 10 belongs.

The host gateway 24 and the system 10 are connected to each other through a wireless or wired private circuit, a public communication circuit and the like. More specifically, various kinds of network such as LAN (Local Area Network), WAN (Wide Area Network), intranet, Internet and the like can be utilized.

It is to be noted that if the protocols of the network to which the host 23 belongs and the network to which the system 10 belongs are same the host gateway 24 can be omitted.

The system 10 comprises an interface processing means 11 as a deposit/withdraw state outputting means, an account processing means 12, a client information management means 13 as a virtual account opening means, a virtual account management means 14 as an account opening executing means, a deposit/withdraw details information DB 15, a client information DB 16, and a virtual account management information DB 17. It is to be noted that the "virtual account" is to be detailed later.

The interface processing means 11 receives the request for various banking-related services from the user operating the user terminal A22a or the user terminal B22b, and then transmits the result processed in the system 10 to the user terminal A22a or the user terminal B22b.

The account processing means 12 requests for the execution of the account process by accessing the host 23.

The client information management means 13 executes the process as the creation, changing, deletion and so on of the virtual account.

The virtual account management means 14 executes the process between the system account and the virtual account or the process between the virtual accounts.

The deposit/withdraw details information database (hereafter, referred to as "DB") 15, the client information DB 16, and the virtual account management information DB 17 store various kinds of information each as a storing means.

The client information of the user registered in the system 10 and the account information on the system account in the user's name are stored in the client information DB 16. The client information includes the user's address, name, cover address and the like while the account information includes the account number, branch number, account classification (savings account and checking account) and the like. It is to be noted that the client information and account information correspond to the client information in the banking agency and the account information on the banking account in the client's name.

When the user transmits a request for various banking-related services by operating the user terminal A22a or the user terminal B22b and accessing the system 10 through the Internet 21, the interface processing means 11 receives the request. At this time, user identification information as well as the request is transmitted from the user terminal A22a or the user terminal B22b. The user identification information includes the user's name registered in advance, ID number and the like.

In the next, the interface processing means 11 acquires the user's client information and account information stored in the client information DB 16 by accessing here, based on the user identification information.

If the request is the one for so-called an account process such as deposit, withdraw, transfer, credit, setting time deposit and debit, the interface processing means 11 transmits the request, the client information and the account information to the account processing means 12.

The account processing means 12 transmits the request for service, the client information and the account information by accessing the host 23 through the host gateway 24 and requests for the execution of the account process. The host 23 executes the requested account process and replies to the account processing means 12 with the result of the process. Then the account processing means 12 stores the result of the process by accessing the deposit/withdraw details information DB 15.

The result of the account process is converted into a specific form by the interface processing means 11 and transmitted to the user terminal A22a or the user terminal B22b.

On the other hand, if the request is the one for so-called a non-account process such as balance inquiry and acquisition of deposit/withdraw details, the interface processing means 11 transmits the request, the client information and the account information to the virtual account management means 14.

The virtual account management means 14 acquires information on the deposit/withdraw in the system account and virtual account of the user, on the balance and the like by accessing the deposit/withdraw details information DB 15 and the virtual account management information DB 17, and executes the requested non-account process, based on each of the information.

The result of the non-account process is converted into a specific form by the interface processing means 11 and transmitted to the user terminal A22a or the user terminal B22b.

The operation of system 10 in this embodiment will be further detailed in reference to FIGS. 2 to 5.

When a client of a banking agency is registered as the user of system 10, a system account corresponding to the banking account of the client respectively is opened at the system 10. If the client has a plurality of banking accounts at the banking agency, a plurality of system accounts corresponding to each of the plural banking accounts respectively are opened at the system 10. It is to be noted that system account number is attached to all the system accounts in order to identify each of the system accounts.

Next, the user requests for the opening of one or more virtual accounts by accessing the system 10 from the user terminal A22a or the user terminal B22b through the Internet 21. If the storage capacity in the system 10 can be saved and a specific processing speed can be obtained, there is no need to put a restriction on the number of virtual account.

If the user has a plurality of system accounts, the user is permitted not only to open virtual accounts with regard to all the system accounts but also to open virtual accounts with regard to some of the system accounts and not to open with regard to the other system accounts.

Also preferably, although the virtual account is opened according to the item of expenditure (for example, public utility charges, housing expenses, food expenses and the like), the user may select the purpose to use freely.

The user can register in the system 10 about what each of the virtual account corresponding to. Hereafter, an explanation will be made by referring to an example that the virtual account corresponds to the item of expenditure.

When the interface processing means 11 receives the request for the opening of virtual account from the user, the request is transmitted to the client information management means 13. And then the client information management means 13 creates the virtual account based on the request and stores the information on the virtual account in the virtual account management information DB 17.

In the virtual account management information DB 17, an account information management table shown in FIG. 2, for example, is stored.

The system account corresponds to the banking account as described above. Therefore, we will call the system account and the banking account "real account" together, which makes a pair to the virtual account.

As clarified in the account information management table, a user A has two real accounts with the account numbers of "1234567" and "3333333". In the first real account (account number 1234567), a virtual account (account name "AAA") and a virtual account (account name "BBB") are opened. The first real account number 1234567 is attached to these two virtual accounts. It is to be noted that the account name cannot be duplicate so as to identify all the real and virtual accounts.

"Restriction on overdrawing to make balance insufficient" in the account information management table shows whether the drawing to make the balance insufficient is prohibited or not. The target of the restriction is basically a virtual account. The function of restriction will be detailed in the fourth embodiment.

When the interface processing means 11 receives the request for the account process from the user terminal A22a or the user terminal B22b, the request is transmitted to the account processing means 12 and the virtual account management means 14. The account processing means 12 and the virtual account management means 14 executes the process between real accounts, between a real account and a virtual account, and between virtual accounts based on the request as shown in FIG. 3.

Figure 3:
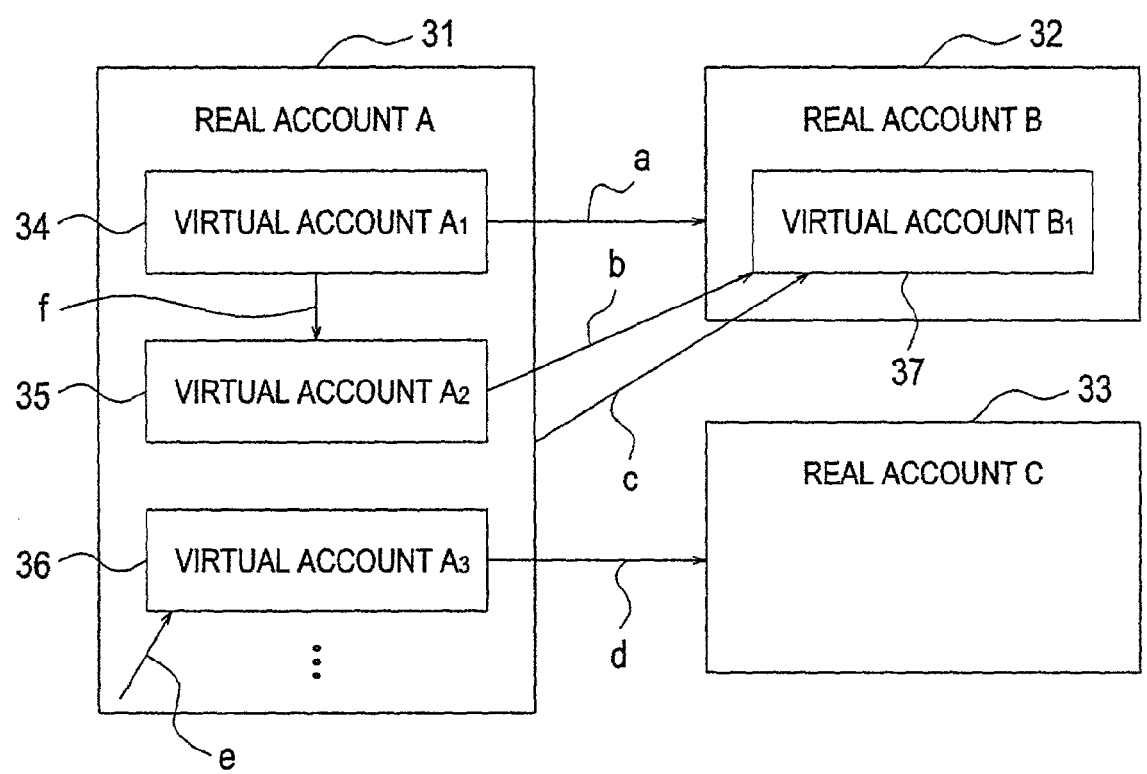
FIG. 3 shows conceptually the process between a real account and a virtual account and the process between virtual accounts in the Internet banking system in the first embodiment of the present invention.

The nominees of real accounts A31, B32 and C33 shown in FIG. 3 can be same or different respectively.

Virtual accounts $A_1$34, $A_2$35 and $A_3$36 are opened in the real account A31 while a virtual account $B_1$37 in the real account B32.

Arrows in FIG. 3 show the flow of money.

An arrow a shows the process from the withdrawal from the virtual account $A_1$34 through the deposit into the master of the real account B32. The master of real account is the region in which the item belonging to none of the items as the target of the virtual account is dealt with.

An arrow b shows the process from the withdrawal from the virtual account $A_2$35 through the deposit into the virtual account $B_1$37.

An arrow c shows the process from the withdrawal from the master of the real account A31 through the deposit into the virtual account $B_1$37.

An arrow d shows the process from the withdrawal from the virtual account $A_3$36 through the deposit into the real account C33.

An arrow e shows the process from the withdrawal from the master of the real account A31 through the deposit into the virtual account $A_3$36.

An arrow f shows the process from the withdrawal from the virtual account $A_1$34 through the deposit into the virtual account $A_2$35.

For example, if the occupation of the nominee for the real account A31 is salaried worker and the virtual account $A_1$34 is opened for direct deposit while the virtual account $A_2$35 for housing expenses, the arrow f shows that a certain amount of money is allocated from the salary as the housing expenses.

On the other hand, if the nominee is a child living in an apartment house separately from his parents and the virtual account $B_1$37 is opened for the rent of the apartment house, the arrow a shows that a certain amount of money is paid by crediting from the parent's salary into the child's real account B32. And the arrow b shows that a certain amount of money is allocated from the housing expenses managed by the parent as the rent of the apartment house.

The deposit/withdraw process between different real accounts will be detailed. In this case, the number of the account in which the deposit process is executed and the number of the account in which the withdrawal process is executed are different each other.

First, the account processing means 12 requests for the execution of the account process by accessing the host 23. And then the host 23 executes the requested account process and replies to the account processing means 12 with the result of process in real-time.

On the other hand, if the number of the account in which the deposit process is executed and the number of the account in which the withdrawal process is executed are same each other, the account processing means 12 does not access the host 23 since the account process can be executed in the same real account.

The result of the process between the accounts is stored in the deposit/withdraw details information DB 15 in the form of deposit/withdraw details table shown in FIG. 4. In this table, the processing date/time, the sum of deposited or withdrawn money, balance, abstract and the like are recorded with regard to all the real and virtual accounts.

When the interface processing means 11 receives the request for the issuance of the deposit/withdraw details from the user terminal A22a or the user terminal B22b, the request is transmitted to the virtual account management means 14. The virtual account management means 14 accesses the deposit/withdraw details information DB 15 and the virtual account management information DB 17, acquires the information on the user's real and virtual accounts and creates the deposit/withdraw details based on the acquired information. The created deposit/withdraw details are transmitted to the interface processing means 11 and converted into a specific form (deposit/withdraw details). The interface processing means 11 replies to the user terminal A22a or the user terminal B22b with the converted deposit/withdraw details.

An example of deposit/withdraw details form is shown in FIG. 5. According to this deposit/withdraw details, the user opens real accounts A and B and opens virtual accounts therein corresponding to each specific item of expenditure. A virtual account $A_1$ corresponds to public utility charges, a virtual account $A_2$ to housing expenses, a virtual account $A_3$ to food expenses and a virtual account $B_1$ to traveling expenses.

The master of real account A is the region in which the item belonging to none of the each item of the virtual accounts $A_1$ and $A_2$ opened at the real account A, that is, none of the public utility charges and housing expenses is dealt with. The master of real account B is the region in which the item that does not belong to the item of the virtual account $B_1$ opened at the real account B, that is, that does not belong to the traveling expenses is dealt with.

The user can grasp the deposit/withdraw state according to the item of expenditure easily from the deposit/withdraw details displayed on a displaying means of the user terminal A22a or the user terminal B22b, or from the deposit/withdraw details printed by a printing means.

According to the first embodiment as described above, one or more virtual accounts are opened targeting a specific item of expenditure. Consequently, the deposit/withdraw state with regard to a specific item of expenditure can be grasped easily and in real-time by summing up each detail of deposit/withdraw in each virtual account.

(Second Embodiment)

The system in the second embodiment of the present invention will be explained in reference to FIGS. 6 and 7.

According to the system in this embodiment, a user A can specify account processes each of which correspond to each of one or more opened virtual accounts respectively. The relation between each of the virtual accounts and each of the account processes are managed by an account information management table shown in FIG. 6.

When a process such as direct deposit, and direct debit is executed on the user's banking account, the result of the process is transmitted from the host 23 to the account processing means 12 in the system 10. Together with the virtual account management means 14, the account processing means 12 having received the result accesses the deposit/withdraw details information DB 15 and the virtual account management information DB 17. And then the account processing means 12 assigns the result to each virtual account, based on the correspondence between each virtual account and each account process both of which are set at the account information management table.

The result of the process on the virtual account is managed in the form of, for example, a deposit/withdraw details table shown in FIG. 7. More specifically, processing date/time, the sum of deposited or withdrawn money, balance, abstract and the like are recorded in the deposit/withdraw details information table with regard to each virtual account. Then the deposit/withdraw details table is stored in the deposit/withdraw details information DB 15.

If the user requests for the issuance of deposit/withdraw details and the balance inquiry, the deposit/withdraw details and the detailed result of balance inquiry, in both of which the deposit/withdraw state according to a specific item of expenditure (for example, direct deposit and direct debit) is described, based on the deposit/withdraw details information table stored in the deposit/withdraw details information DB 15, can be created according to the system in this embodiment.

According to the second embodiment as described above, each virtual account are opened to correspond to each account process with regard to the banking agency. Consequently, specific processing state and record can be grasped easily and in real-time by summing up each detail of deposit/withdraw in each virtual account.

(Third Embodiment)

The system in the third embodiment of the present invention will be explained in reference to FIG. 8.

According to the system in this embodiment, each user can specify a plurality of virtual accounts with regard to one item of expenditure (one account process). The number of specifiable virtual accounts can be arbitrarily decided by the user. Each user set the condition in advance such as percentage, amount of money and priority on the deposit/withdraw in each virtual account. The condition is recorded in a virtual account distribution table as shown in FIG. 8.

The percentage and amount of money are used as the standard of deposit/withdraw distribution on each virtual account. In addition, the priority is set on each virtual account, and the deposit/withdraw process is executed from the virtual account with high priority, that is, with priority "1".

The operation of the system in this embodiment will be described.

When a process such as direct deposit and direct debit is executed on the user's banking account, the result of the process is transmitted from the host 23 to the account processing means 12. Together with the virtual account management means 14, the account processing means 12 having received the result accesses the deposit/withdraw details information DB 15 and the virtual account management information DB 17. And then the account processing means 12 distributes the result to each virtual account, based on a distributing means that is set at the virtual account distribution table.

If each user sets the distributing means by the contents of the virtual account distribution table shown in FIG. 8, the deposit/withdraw operation is carried out as follows in the system.

A user A sets the distribution means so that if some money is paid into a user A's real account by direct deposit, 70% of total sum will be deposited into a virtual account AA and 30% is deposited into a virtual account AB. Consequently for example, if 1,000,000 yen is paid into the user A's real account, 700,000 yen is deposited into the virtual account AA and 300,000 yen into the virtual account AB.

A user B sets the distribution means so that if some money is paid into a user B's real account by direct deposit, 30,000 yen will be deposited into a virtual account BA, 200,000 yen will be deposited into a virtual account BB and 30,000 yen will be deposited into the virtual account BC. Furthermore, the user B sets the priority "1" on the virtual account BA, the priority "2" on the virtual account BB and the priority "3" on the virtual account BC.

Consequently for example, if 1,000,000 yen is paid into the user B's real account, 30,000 yen is deposited into the virtual account BA, 200,000 yen into the virtual account BB and 30,000 yen into the virtual account BC. And the rest 740,000 yen is deposited into the master of the user B's real account.

However, if only 250,000 yen is deposited into the user B's real account, 30,000 yen is deposited into the virtual account BA, 200,000 yen into the virtual account BB and the rest 20,000 yen into the virtual account BC, according to the priority set in advance.

A user C sets the distribution means so that if some money is paid from a user C's real account by direct debit of phone bill, 50,000 yen will be withdrawn from a virtual account CA and 100,000 yen will be withdrawn from a virtual account CB. Furthermore, the user C sets the priority "1" on the virtual account CA, the priority "2" on the virtual account CB.

Consequently for example, if 150,000 yen of phone bill is paid from the user C's real account, 50,000 yen is withdrawn from the virtual account CA and 10,000 yen from the virtual account CB.

However, if only 70,000 yen is withdrawn from the user C's real account, 50,000 yen is withdrawn from the virtual account CA and the rest 20,000 yen from the virtual account CB, according to the priority set in advance.

The result of process of deposit/withdraw distribution to each virtual account is stored in the deposit/withdraw details information DB 15 in a form of the deposit/withdraw details table shown in FIG. 7. It is to be noted that same details number, processing date/time and abstract are attached to a plurality of virtual accounts forming a group for the purpose of deposit/withdraw distribution, that is, to the virtual accounts AA and AB in this embodiment.

According to the third embodiment as described above, deposit/withdraw is distributed to a plurality of specific virtual accounts. For example, if virtual accounts are opened according to the item of expenditure, the deposit/withdraw can be automatically distributed according to the item of expenditure. In addition, each user can plan easily the deposit/withdraw according to the item of expenditure.

(Fourth Embodiment)

The account information management table belonging to the system in the fourth embodiment of the present invention and stored in the virtual account management information DB 17 has a field of "restriction on overdrawing to make balance insufficient" as shown in FIG. 2. With this structure, each user can prohibit a process in which the balance would be insufficient.

The virtual account management means 14 watches the balance of each virtual account by accessing the virtual account management information DB 17. And if a user requests for a withdrawal process to make the balance insufficient with regard to the prohibited virtual account, the execution of the withdrawal process is suspended according to the system in this embodiment.

The operation of the system in this embodiment will be detailed by referring to a concrete example.

If a user wants to refrain from overspending with regard to, for example, recreation expenses and entertainment expenses, the user opens the virtual accounts corresponding to these items of expenditures. And then the user sets a restriction on these virtual accounts to prohibit overdrawing (withdrawal process) to make the balance insufficient. Further, the user deposits a certain amount of money into the virtual accounts with the withdrawal prohibition in advance.

After some money has been withdrawn from each virtual account with the withdrawal prohibition for some times and the total of withdrawn money has reached the amount of money initially deposited into the virtual account with the withdrawal prohibition, the withdrawals for recreation expenses and entertainment expenses are prohibited since the balance becomes insufficient.

According to the fourth embodiment as described above, each user can put a restriction on overdrawing to make the balance insufficient with regard to a specific item of expenditure.

It is to be noted that each user can set arbitrarily a certain amount of money as well as zero as the standard for withdrawal restriction on virtual account. In this case, the withdrawal process is prohibited after the balance of the virtual account with the withdrawal prohibition has reached the same amount of money as the standard. Also, the system can be structured so that the deposit of money with more than a certain amount may be prohibited. By structuring as this, money can be prevented from being pooled in an amount than necessary.

(Fifth Embodiment)

The system in the fifth embodiment of the present invention will be explained in reference to FIG. 9.

According to the system in this embodiment, each user can open a virtual account related to a plurality of real accounts.

Hereafter, the operation of the system in this embodiment will be detailed by referring to the following example as shown in FIG. 9. A user A opens the first real account with the number 1234567 and the second real account with the number 2222222. In the first real account, the user A opens a virtual account A corresponding to direct deposit, a virtual account B to direct debit (electricity expenses) and a virtual account C to the debit of a credit card. In the second real account on the other hand, the user A opens a virtual account B to direct debit (gas expenses) and a virtual account C to the crediting into B's account.

According to the system in this embodiment, the user A can set the system so that the virtual account B in the first real account and the virtual account B in the second real account can be dealt as the same single account in the system. This setting is equal to the opening of the virtual account B related to both the first and second real accounts.

Similarly, the user A can set the system so that the virtual account C in the first real account and the virtual account C in the second real account can be dealt as the same single account in the system. This setting is equal to the opening of the virtual account C related to both the first and second real accounts.

When the virtual accounts A, B and C are opened as shown in FIG. 9, the electricity expenses are paid by direct debit from the first real account while the gas expenses are paid by direct debit from the second real account, according to the account process in the banking account. And at the same time, both expenses are paid by direct debit from the virtual account B according to the account process in the virtual account in the system. The user A can grasp the deposit/withdraw state with regard to items of expenditures of direct debit in the first and second real accounts by summing up each detail of deposit/withdraw in the virtual account B.

Also, the settlement expenses of credit card are paid by crediting from the first real account into a specific account while the money to be paid B are paid by crediting from the second real account into B's account, according to the account process in the banking account. And at the same time, both expenses are paid by direct debit from the virtual account C according to the account process in the virtual account in the system. The user A can grasp the deposit/withdraw state with regard to items of expenditures of crediting in the first and second real accounts by summing up each detail of deposit/withdraw in the virtual account C.

Although this embodiment has been described by referring to the case that the user A has a plurality of real accounts and opens the virtual account related to these real accounts described above, each user can open a virtual account related to a plurality of real accounts each with different nominee.

For example, if a plurality of associated companies making a group of company are respectively the user in the system, a representative company in the group opens a virtual account related to each real account owned by each associated company by setting expenses for materials to be purchased by each associated company jointly as a target item of expenditure. Hereby the management of materials-purchasing expenses in the entire group can be united.

According to the fifth embodiment as described above, each user can grasp the deposit/withdraw state with regard to an item of expenditure corresponding to a plurality of real accounts in common easily and in real-time by opening a virtual account related to a plurality of real accounts.

Also, each user can grasp the deposit/withdraw state with regard to an item of expenditure related to a plurality of users in common easily and in real-time.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

From the first through fifth embodiments have been explained by referring to an example that the user accesses the system 10 by operating the user terminal A22a or the user terminal B22b, however, the present invention is not restricted to this example. The present invention can be adopted to so-called a tele-banking system using a telephone, IVR (Interactive Voice Response) system and the like.

Further, the present invention can be adopted to all kinds of services provided by various kinds of banking agencies. The services include the ones related to the dealings with regard to a bond and securities and the ones related to the purchases of life insurance and accident insurance.

What is claimed is:

1. An account management system for managing one or more real accounts opened at a banking agency comprising:
   a virtual account opening means for opening a virtual account correlated to a real account opened at the banking agency according to an instruction from terminal equipment through a network, the real account having a plurality of account processes, including depositing money and withdrawing money, the virtual account being a part of the real account so that the virtual account is used for managing a predetermined account process among all of the account processes of the real account; and
   an account process management means for depositing money that is deposited into the real account, into the virtual account correlated to the real account if depositing money is the predetermined account process, and withdrawing money that is withdrawn from the real account, from the virtual account correlated to the real account if withdrawing money is the predetermined account process.

2. The account management system of claim 1, wherein the virtual account opening means opens a plurality of virtual accounts correlated to the real account.

3. The account management system of claim 2, further comprising a distribution means for providing a virtual account distribution table indicating (i) a percentage and an amount of money that is to be deposited into and withdrawn from each of the plurality of virtual accounts, and (ii) a priority on depositing and withdrawing money into and from each of the plurality of virtual accounts,
   wherein the account process management means deposits the money into, and withdraws the money from each of the plurality of virtual accounts according to the virtual account distribution table.

4. The account management system of claim 3, wherein:
   the plurality of virtual accounts include a first and a second virtual account; and
   the virtual account opening means correlates the first virtual account to the second virtual account, so that the account process management means deposits a specific portion of money that is deposited into the first virtual account, into the second virtual account.

5. The account management system of claim 2, wherein the virtual account opening means allocates (1) a first virtual account among the plurality of virtual accounts for executing a first particular account process with regard to an expense for a first specific purpose, among all account processes of the real account, and (2) a second virtual account among the plurality of virtual accounts for executing a second particular account process with regard to an expense for a second specific purpose, among all account processes of the real account.

6. The account management system of claim 5, wherein the virtual account opening means creates a restriction for preventing the first particular account process from being executed if a balance of the first virtual account is insufficient for executing the first particular account process.

7. The account management system of claim 5, wherein:
   the virtual account opening means further allocates a third virtual accounts, so that the first and third virtual accounts execute the first particular account process at predetermined percentages among the first and third virtual accounts; and
   the account process management means distributes money that is deposited into the real account for executing the first particular account process, into the first and third virtual accounts respectively at the predetermined percentages.

8. The account management system of claim 1, further comprising a database for storing results of account processes executed through the real account and the virtual account in a form of a transaction statement table,
   wherein the account process management means provides a transaction statement for the real and virtual accounts by using the transaction statement table.

9. The account management system of claim 1, wherein
   the virtual account opening means correlates the virtual account to another real account opened at the banking agency, so that the account process management means automatically transfers, when money is deposited into the virtual account, the deposited money from the virtual account to said another real account.

10. The account management system of claim 1, wherein the virtual account opening means assigns the virtual account an account number identical to an account number assigned to the real account and further assigns the virtual account an account name for identifying the virtual account.

11. The account management system of claim 1, wherein the virtual account opening means correlates the virtual account to a plurality of real accounts opened at the banking agency, so that the virtual account is used for managing each predetermined account process of each of the plurality of real accounts.

12. The account management system of claim 11, further comprising a database for storing results of account processes executed through the virtual account and the plurality of real accounts,
wherein the account process management means provides transaction information about the virtual account by using the stored results, so as to show said each predetermined account process of each of the plurality of real accounts.

13. An account management method for managing one or more real accounts opened at a banking agency comprising the steps of:
opening a virtual account correlated to a real account opened at the banking agency according to an instruction from terminal equipment through a network, wherein (i) the real account has a plurality of account processes including depositing money and withdrawing money, and (ii) the virtual account is a part of the real account so that the virtual account is used for managing a predetermined account process among all account processes of the real account;
depositing money that is deposited into the real account, into the virtual account correlated to the real account if depositing money is the predetermined account process; and
withdrawing money that is withdrawn from the real account, from the virtual account correlated to the real account if withdrawing money is the predetermined account process.

14. The account management method of claim 13, wherein the step of opening includes a plurality of virtual accounts correlated to the real account are opened.

15. The account management method of claim 14, further comprising the steps of:
providing a virtual account distribution table indicating (i) a percentage and an amount of money that is to be deposited into and withdrawn from each of the plurality of virtual accounts, and (ii) a priority on depositing and withdrawing money into and from each of the plurality of virtual accounts; and
depositing and withdrawing the money into and from each of the plurality of virtual accounts according to the virtual account distribution table.

16. The account management method of claim 15, wherein the plurality of virtual accounts include a first virtual account and a second virtual account, further comprising a step of correlating the first virtual account to the second virtual account so that a specific portion of money that is deposited into the first virtual account, is deposited into the second virtual account.

17. The account management method of claim 14, further comprising a step of allocating (1) a first virtual account among the plurality of virtual accounts for executing a first particular account process with regard to an expense for a first specific purpose among all account processes of the real account, and (2) a second virtual account among the plurality of virtual accounts for executing a second particular . account process with regard to an expense for a second specific purpose among all account processes of the real account.

18. The account management method of claim 17, further comprising a step of creating a restriction for preventing the first particular account process from being executed if a balance of the first virtual account is insufficient for executing the first particular account process.

19. The account management method of claim 17, further comprising the steps of:
allocating a third virtual account among the plurality of virtual accounts, so that the first and third virtual accounts execute the first particular account process at predetermined percentages among the first and third virtual accounts; and
distributing money that is deposited into the real account for executing the first particular account process, into the first and third virtual accounts respectively at the predetermined percentages.

20. The account management method of claim 13, further comprising the steps of:
storing results of account processes executed through the real account and the virtual account in a form of a transaction statement table; and
providing a transaction statement for the real and virtual accounts by using the transaction statement table.

21. The account management method of claim 13, further comprising a step of correlating the virtual account to another real account opened at the banking agency, so that money deposited into the virtual account is automatically transferred to said another real account.

22. The account management method of claim 13, further comprising the steps of:
assigning the virtual account an account number identical to an account number assigned to the real account; and
further assigning the virtual account an account name for identifying the virtual account.

23. The account management method of claim 13, wherein the virtual account is correlated to a plurality of real accounts opened at the banking agency, so that the virtual account is used for managing each predetermined account process of each of the plurality of real accounts.

24. The account management method of claim 23, further comprising the steps of:
storing results of account processes executed through the virtual account and the plurality of real accounts; and
providing transaction information about the virtual account by using the stored results, so as to show said each predetermined account process of each of the plurality of real accounts.

* * * * *